(12) United States Patent
Daniell et al.

(10) Patent No.: US 6,678,421 B1
(45) Date of Patent: Jan. 13, 2004

(54) SUBBAND COEFFICIENT PREDICTION WITH PATTERN RECOGNITION TECHNIQUES

(75) Inventors: Cindy Daniell, Pasadena, CA (US); Roy Matic, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 305 days.

(21) Appl. No.: 09/565,297

(22) Filed: Oct. 9, 2000

Related U.S. Application Data

(60) Provisional application No. 60/210,866, filed on Jun. 9, 2000.

(51) Int. Cl.[7] .................................................. G06K 9/36
(52) U.S. Cl. ........................ 382/240; 382/248; 382/238
(58) Field of Search ............................... 382/117, 190, 382/238–251; 358/1.9; 375/240.01

(56) References Cited

U.S. PATENT DOCUMENTS

| | | | | | |
|---|---|---|---|---|---|
| 5,321,776 | A | * | 6/1994 | Shapiro | 382/240 |
| 6,148,110 | A | * | 11/2000 | Yajima et al. | 382/240 |
| 6,233,358 | B1 | * | 5/2001 | Acharya | 382/248 |

FOREIGN PATENT DOCUMENTS

| | | | | | |
|---|---|---|---|---|---|
| EP | 0 914 004 | A1 | * | 5/1999 | H04N/7/26 |
| JP | 09182069 | A | * | 7/1997 | H04N/7/30 |
| JP | 09238081 | A | * | 9/1997 | H03M/7/30 |
| JP | 11088183 | A | * | 3/1999 | H03M/7/30 |
| WO | WO 9828917 | A1 | * | 7/1998 | H04N/7/26 |

OTHER PUBLICATIONS

"Subband Prediction Using Leakage Information in Image Coding," Vaisey J., IEEE Transactions on Communications, vol. 43, No. 2/3/4, Feb./Mar./Apr. 1995, pp. 216–221.*

"Haar Wavelet Transform with Interband Prediction and Its Application to Image Coding," Kuroki, N. et al., Electronics and Communications in Japan, Part 3, vol. 78, No. 4, 1995, pp. 103–114.*

C. Daniell and R. Matic, "Neural Networks for Coefficient Prediction in Wavelet Image Coders," in "Engineering Applications of Bio–Inspired Artificial Neural Networks," J. Mira, J.V. Sanchez–Andres (Eds.), International Work–Conference on Artificial and Natural Neural Networks, IWANN'99, Alicante, Spain, Jun. 2–4, 1999, Proceedings, vol. II.

* cited by examiner

*Primary Examiner*—Wenpeng Chen
(74) *Attorney, Agent, or Firm*—Tope-McKay & Associates

(57) ABSTRACT

A method and an apparatus for estimating the upper frequency band coefficients solely from low frequency information in a subband multiresolution decomposition. In operation, a Bayesian classifier predicts the significance or insignificance of a high frequency signal, then a neural network estimates the sign and magnitude of the visually significant information and effectively eliminates insignificant information. Finally an algorithm estimates upper frequencies based on lower frequencies within the same band. This estimation is performed recursively for each level of a multiresolution decomposition pyramid until a reconstructed version of the data product is returned.

23 Claims, 12 Drawing Sheets

•1 to 4 upsampling between levels

SUBBAND COEFFICIENT PREDICTION WITH PATTERN RECOGNITION TECHNIQUES

CROSS-REFERENCE TO RELATED APPLICATIONS

This non-provisional application claims the benefit of priority to U.S. provisional application No. 60/210,866, filed in the United States on Jun. 9, 2000, entitled "Subband Coefficient prediction with pattern recognition techniques."

TECHNICAL FIELD

The present invention relates to a subband encoding and predictive decoding method and apparatus. More specifically, it relates to an encoding and predictive decoding method and apparatus wherein data signals are encoded and decoded by estimating the higher frequency subband coefficient from the low frequency information in a subband multiresolution data decomposition.

BACKGROUND OF THE INVENTION

Existing subband coefficient prediction systems generally provide an algorithm that utilizes the coefficients in one level (level n−1) to predict the coefficients in the next level (level n), which requires a one to four up-sampling of the information. Some existing prediction techniques rely on a joint probability distribution between coefficients in adjacent bands. The main disadvantage of the techniques is their inability to predict the sign of the estimated coefficients. Existing systems use linear estimation techniques and are prone to inaccuracies because in many situations the data does not follow a linear pattern. Another drawback of existing techniques is that they require the estimation of four coefficients from a single set of joint probabilities. A third drawback found in existing systems pertains to the manner in which the coefficient estimates are made. Specifically, the coefficient estimates rely on correlations between adjacent levels in a subband decomposition. Such correlations are diminutive as compared to correlations between subbands of the same level. Further, existing techniques require an additional embedded algorithm, such as the zerotree algorithm, to distinguish between significant and insignificant coefficients. The distinction between significant and insignificant information is often important for applications of subband coefficient prediction, such as Very Low Bit Rate Coding. Finally, existing techniques are not very conducive to data encryption because the joint probability distribution between coefficients in the wavelet domain can be readily acquired.

SUMMARY OF THE INVENTION

The present invention provides a data compression method and apparatus that is more robust and more efficient than previous, comparable systems. One embodiment of the invention provides a means for predicting the values of upper subband frequency coefficients in a subband decomposition pyramid. According to this embodiment the decomposition pyramid has n decomposition levels, where n is the highest level in the pyramid, and each level in the decomposition has a plurality of subbands. Further each subband has a plurality of coefficients and each coefficient has a sign, magnitude and significance or an insignificance. Additionally, the plurality of subbands includes at least one vertical subband. The vertical subband includes a plurality of low frequency coefficients from the vertical data components from within the highest level of the decomposition pyramid and at least one horizontal subband. The horizontal subband includes a plurality of low frequency coefficients from the horizontal data components within the n level of the decomposition pyramid and a plurality of high frequency coefficients from the vertical data components within the n level of said decomposition pyramid and at least one diagonal subband comprising a plurality of high frequency coefficients from both the vertical and horizontal data components within the n level of said decomposition pyramid. Further, the coefficients for the vertical and horizontal subbands are predicted from information contained in a low pass subband of level n, and the coefficients for the diagonal subband are predicted from information in the vertical and horizontal subbands. Finally the prediction process is carried out recursively setting n equal to n−1 for each level of the decomposition until n equals 0 and the original image size has been reconstructed.

Another embodiment of the present invention provides a means for predicting coefficients in the $n^{th}$ level of an n-level multiresolution decomposition pyramid. The pyramid has a plurality of subbands including a low-pass subband, a vertical subband, a horizontal subband and a diagonal subband, wherein a plurality of the subbands have higher and lower frequency coefficients. The predicted coefficients are used to predict upper frequency coefficients for the vertical, horizontal and diagonal subbands in the multiresolution decomposition pyramid for levels at and below n. This is achieved by defining n as the number of levels in the multiresolution decomposition pyramid, estimating the coefficient properties of the vertical, horizontal and diagonal subbands, reconstructing the low frequency subband of level n−1 with the aid of a conventional analysis/synthesis filter bank. In a subsequent step n is replaced with n−1 and the sequence is repeated until n is equal to zero. When n is equal to zero the data has been fully re-composed.

In yet another embodiment of the present invention, a conventional analysis filter array is used to decompose an image having rectangular dimensions. This analysis filter or bank of filters produces a multiresolution decomposition, wherein the multiresolution decomposition comprises a low pass subband, and a plurality of upper subbands, wherein said upper subbands include a vertical subband, a horizontal subband and a diagonal subband and wherein each subband has a plurality of coefficients. The rectangular dimensions are then encoded and transmitted to the decoder to allow for the dimensionally correct reconstruction of the final image. Next, the low pass subband is encoded. Care is taken to minimize the risk of distortion, as this subband will serve as the basis for the reconstructed image. The next step is to determine an optimal threshold for the other subbands, namely the horizontal, vertical, and diagonal subbands. For this, a Bayesian Classifier is used, and all of the upper subband coefficients labeled as significant or insignificant based on the optimal threshold. Next, significance map errors and other misclassifications are stored for transmission. A neural network makes use of data from the multiresolution decomposition and stores errors made in the sign of the predicted value as well as the errors made in predicting the magnitude. Both magnitude and sign errors are defined as:

error term=|true value|−|predicted value|.

When the data is received at the decoder, the x and y dimensions for the final image, as well as the coding methods selected for the binary strings denoting the significance map and sign flip errors, are decoded. Then the low frequency subband is decoded. The next step includes operating the Bayesian Classifier and labeling all of the upper subband coefficients as significant or insignificant based on the decoded threshold value, decoding the significance map errors and correcting any misclassifications, operating the neural network and extracting values, both sign and magnitude, for all the significant coefficients and decoding the magnitude and sign flip errors, and computing the coefficient's predicted value by the following equation, reconstructed value=(|predicted value|+error term)*sign flip error*sign value The final step employs conventional subband synthesis filters compatible with the subband analysis filters to reconstruct the original image.

Yet another embodiment of the present invention provides an apparatus for predicting upper frequency band coefficients from low frequency information in a multiresolution subband decomposition having an n-level multiresolution decomposition pyramid. This pyramid includes a plurality of subbands including a low-pass subband, a vertical subband, a horizontal subband and a diagonal subband. Wherein a plurality of the subbands have higher and lower frequency subband coefficients. The predicted coefficients are used to predict upper frequency coefficients for the vertical, horizontal and diagonal subbands in the multiresolution decomposition pyramid for levels at and below n wherein the apparatus comprises the following: a Bayesian based classifier capable of predicting the significance, or insignificance of a high frequency signal. A neural network capable of estimating the sign and magnitude of the visually significant information. The means for estimating is capable of distinguishing the upper frequencies from lower frequencies within the same level of the decomposition pyramid and subsequently is capable of performing this estimation recursively at each level of the multiresolution decomposition.

BRIEF DESCRIPTION OF THE DRAWINGS

FIG. 3a depicts a visual image in a single-level, multiresolution decomposition, analogous to the depiction set forth in FIG. 2a;

FIG. 3b depicts a four-level image decomposition pyramid;

DETAILED DESCRIPTION OF THE PREFERRED EMBODIMENTS

Figure 1:
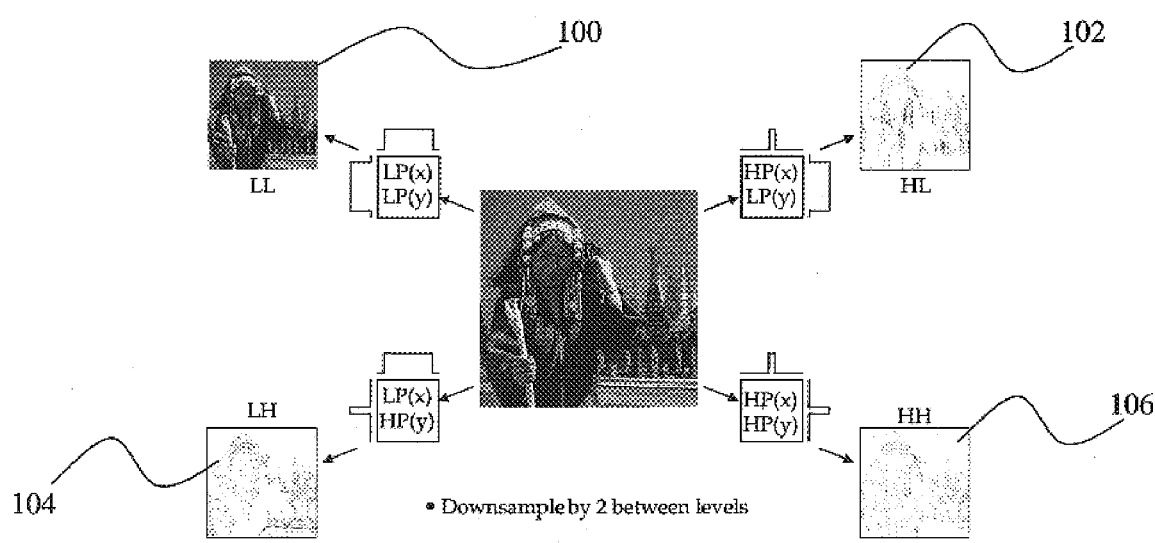
FIG. 1 depicts an image decomposition or the subband analysis of the image, in this depiction the subbands are separated into a plurality of unique frequency subbands.

The present invention provides a method and an apparatus useful for operations on data handling and management, for estimating higher frequency band coefficients from low frequency information in a subband multiresolution decomposition, and may be tailored to a variety of other applications. The following description, in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

According to one embodiment, this invention relates to a means for estimating the higher frequency band coefficients from the low-frequency signal components in a subband multiresolution decomposition. This is achieved by using a Bayesian classifier to predict the significance or insignificance of the higher frequency signal components, and using a neural network to estimate the sign and magnitude of the visually significant information. The present invention can significantly reduce bandwidth requirements, the extent of the reduction being dependent on the individual image characteristics as well as the signal-to-noise ratio required by the receiver.

One area of application of the present invention is data compression. The invention can be used to improve the bit rate of subband-based compression techniques, including wavelet-based compression techniques, without discernable distortion of image quality. There are many wavelet-based image, video, audio, and speech coders that could be improved, in terms of bit-rate, by utilizing the present invention.

The present invention initially performs a wavelet decomposition on a data set, for instance a data set in the form of image data. The wavelet decomposition thereby decomposes the image signals into a plurality of different frequency bands, wherein each frequency band is comprised of a plurality of subbands, and each subband, in turn, is comprised of coefficients resulting from the wavelet decomposition. The significance of each of the different coefficients of the subbands is then determined using a Bayesian classifier. Coefficients classified as insignificant are assigned values of zero and are neglected in later processing steps.

The analysis of image subbands involves separating the subband into several frequency bands, and processing each band separately. Subband image coders apply the analysis transform recursively to the low frequency subband, resulting in a multiresolution decomposition, or pyramid decomposition. Although this application will focus on a square quaternary structure, it should be understood that other forms could be used without departing from the spirit of the invention.

The decomposition signal is downsampled between levels of recursion. With each downsampling, there is an associated loss of information. This loss is accounted for at the decoder, or inverse transform synthesizer, by synthesis filters that are applied recursively to upsample the pyramidal level and to reconstruct the original image. A typical level of the multiresolution pyramid has four subbands of information, one composed of only low-frequency components, the LL subband, and three containing high-frequency components, the HL, LH, and HH subbands. One portion of the present invention, predicts the value of high-frequency coefficients from low frequency coefficients within the same level of the multiresolution decomposition. The prediction process comprises two steps, first a Bayesian classifying step, in which a Bayesian classifier is used to classify the high-frequencies as significant or insignificant. Coefficients classified as insignificant will have a predicted value of zero. Second, coefficients that are classified as significant will have the sign and magnitude of their value estimated by a neural network. Both steps are performed in each of the three high-frequency subbands. The details of the coefficient prediction are similar for all three upper subbands, except for the geometry and content of their input fields. To retrieve the image, the decoder estimates the coefficients of the three high-frequency subbands of the lowest level in the decomposition pyramid level. Next, the low-frequency subband of the next level up is reconstructed with the synthesis filters designed in the subband decomposition. This recursion is performed until the original image size has been reconstructed.

In one embodiment of the present invention, the invention initially performs a wavelet decomposition on a data set, for instance a data set in the form of image data. During the wavelet decomposition, the original image is decomposed into a plurality of frequency subbands, as shown in FIG. 1. As shown, each subband corresponds to a frequency-based image component. In the Low Low (LL) subband 100, a low-pass filter operates on both the vertical and the horizontal image components, or in the Cartesian system the low-pass filter selectively passes the low-frequency components in both the x and y planes. This subband is also known as the low-pass subband. In the High Low (HL) subband 102, a low-pass filter operates on components in the vertical (y) direction while a high-pass filter operates on components in the horizontal (x) direction. This portion of the decomposed image is also known as the vertical subband. In the Low High (LH) subband 104, a high-pass filter operates in the vertical (y) direction while a low-pass filter operates in the horizontal (x) direction. The resulting subband is referred to as the horizontal subband. Finally, in the High High (HH) subband 106, a high-pass filter operates in both the x and y directions. The resulting component is known as the diagonal subband.

Figure 2:
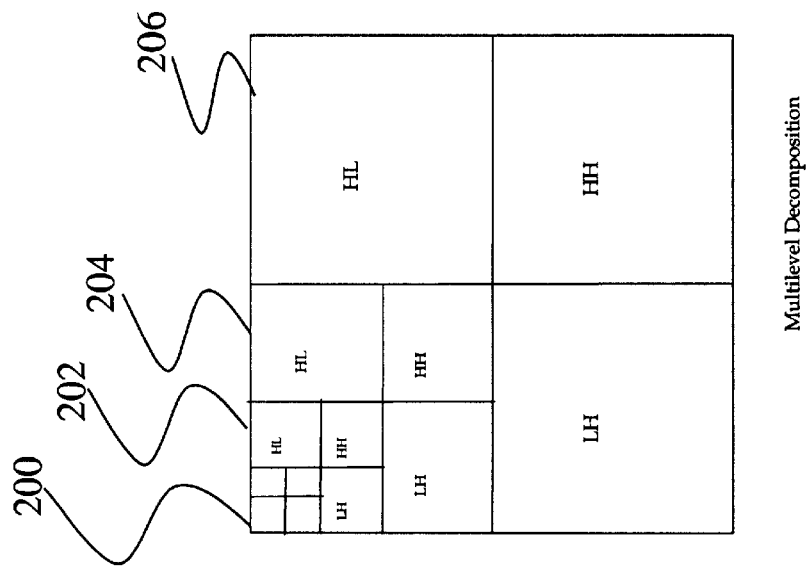
FIG. 2a is a representation of a single level of multiresolution decomposition, having unique frequency bands.
FIG. 2b depicts a four-level decomposition pyramid also having unique frequency bands.
Figure 2:
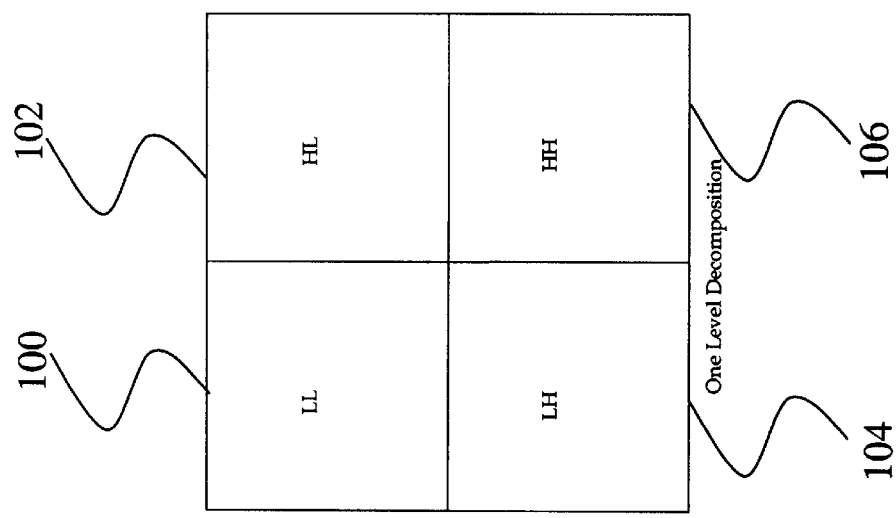
Figure 3:
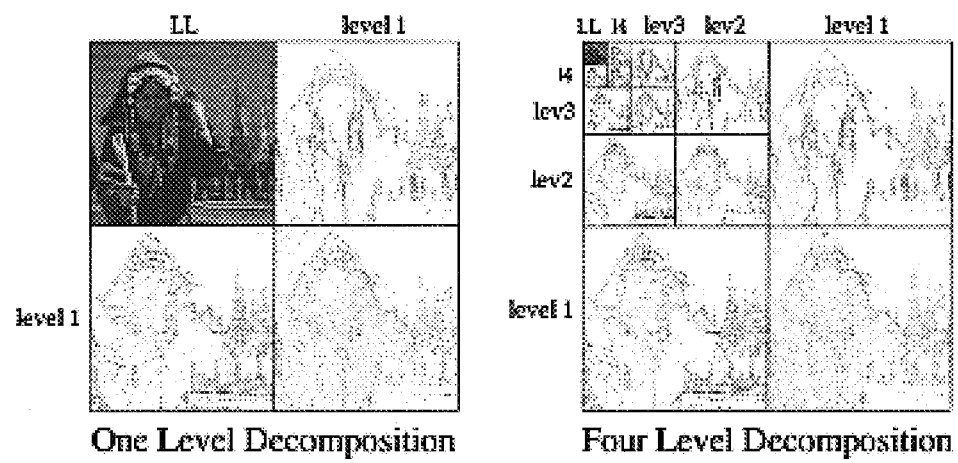

The four subbands of the first level of a decomposition pyramid are shown if FIG. 2(a). The decomposition process, as described relative to FIG. 1, is carried out on the LL subband. This is done recursively, as shown in FIG. 2(b), until the desired pyramid level is obtained. In this case, a four level pyramid is depicted. Level four 200, level three 202, level two 204, and level one 206 are depicted in FIG. 2b and correspond to multiresolution decomposition for an image as depicted in FIG. 3. FIG. 3 is equivalent to FIG. 2, except that it demonstrates the process in the context of an actual image.

Figure 4:
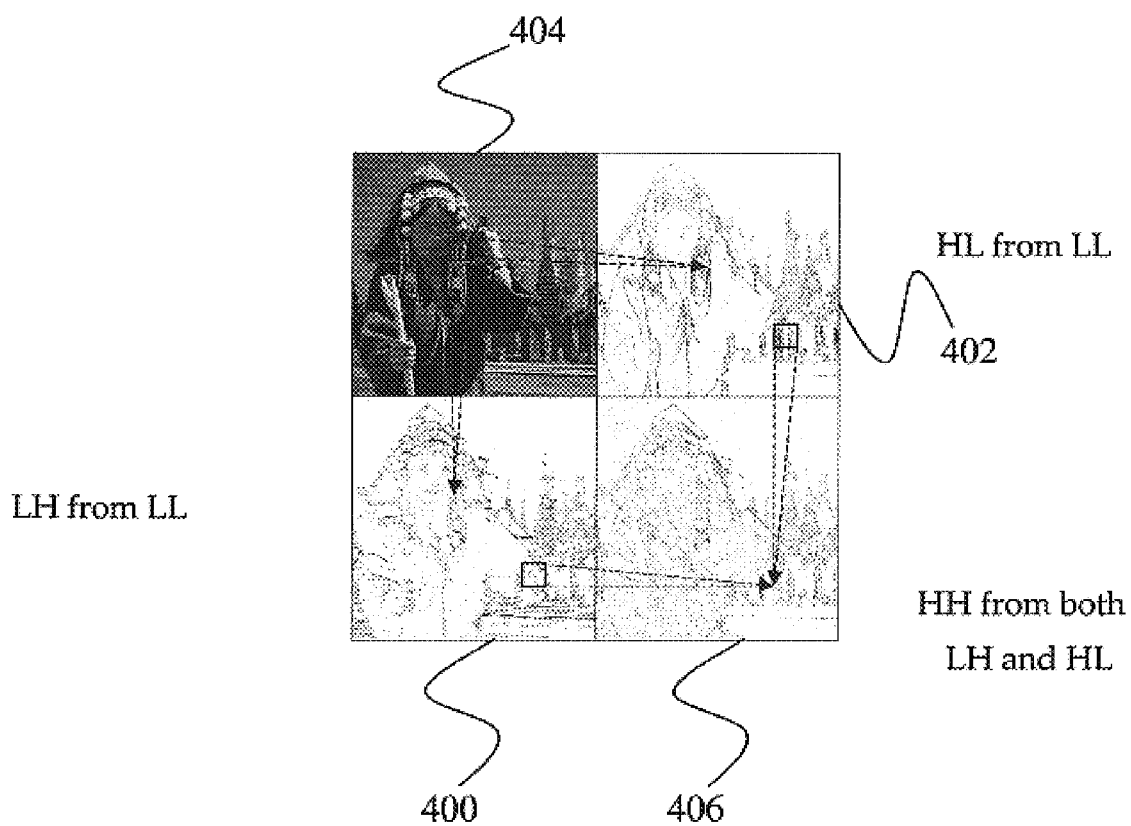
FIG. 4 depicts a visual image in a single-level, multiresolution decomposition; the figure depicts the prediction scheme within a single band or level, in which the coefficients of the low pass subband provide data to the vertical and horizontal subbands which, in turn, provide data to the diagonal subband.
Figure 5:
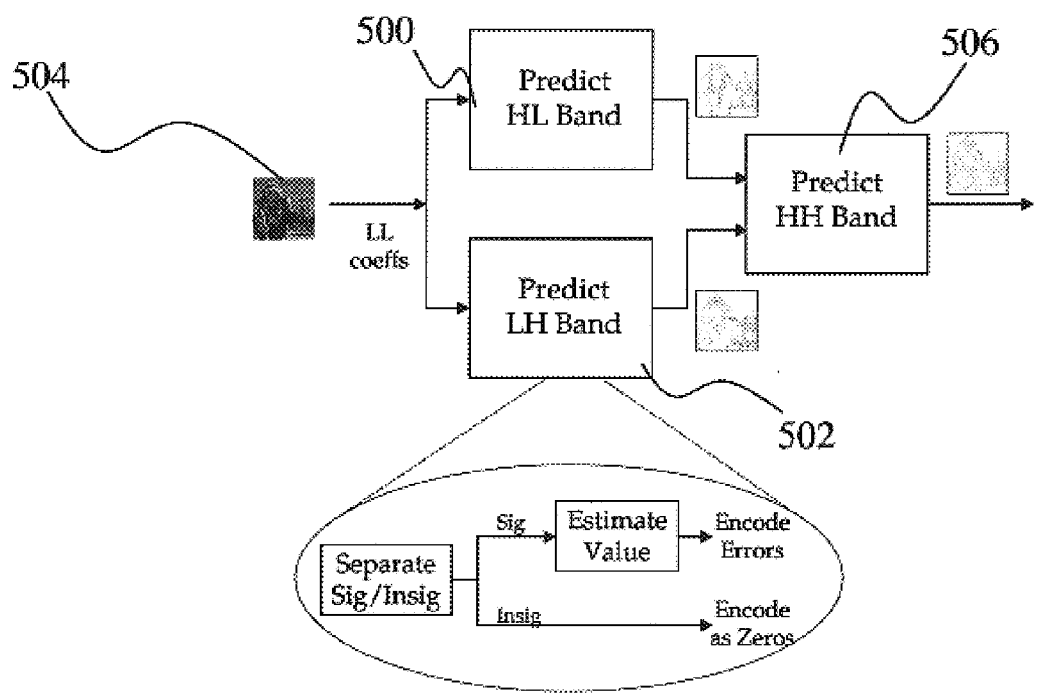
FIG. 5 is a diagrammatic summary of the prediction process for the coefficients of one level within a multiresolution decomposition.

The present invention predicts the value of upper frequency coefficients from lower frequency coefficients within the same level of the multiresolution decomposition pyramid. This is shown in FIG. 4, wherein the LH 400 and HL 402 coefficients are predicted from the LL 404 coefficients, while the HH 406 coefficients are predicted from the predicted values of the LH 400 and HL 402 coefficients. A summary of the prediction process is depicted in FIG. 5. The coefficients of one level within a multiresolution decomposition pyramid are shown. First, the HL subband coefficients 500 and the LH subband coefficients 502 are predicted from the LL coefficients 504. The predicted values of the HL subband coefficients 500 and LH subband coefficients 502 are then used to predict the HH subband coefficients 506. Within the prediction of each subband, the algorithm of the present invention performs two steps. First, it separates the significant and insignificant coefficients. Second, the coefficients deemed insignificant are assigned a predicted value of zero and are thus effectively neglected. Conversely, coefficients that are classified as significant have the sign and magnitude of their values estimated by a neural network. The process is carried out recursively over each level of the pyramidal decomposition.

Figure 6:
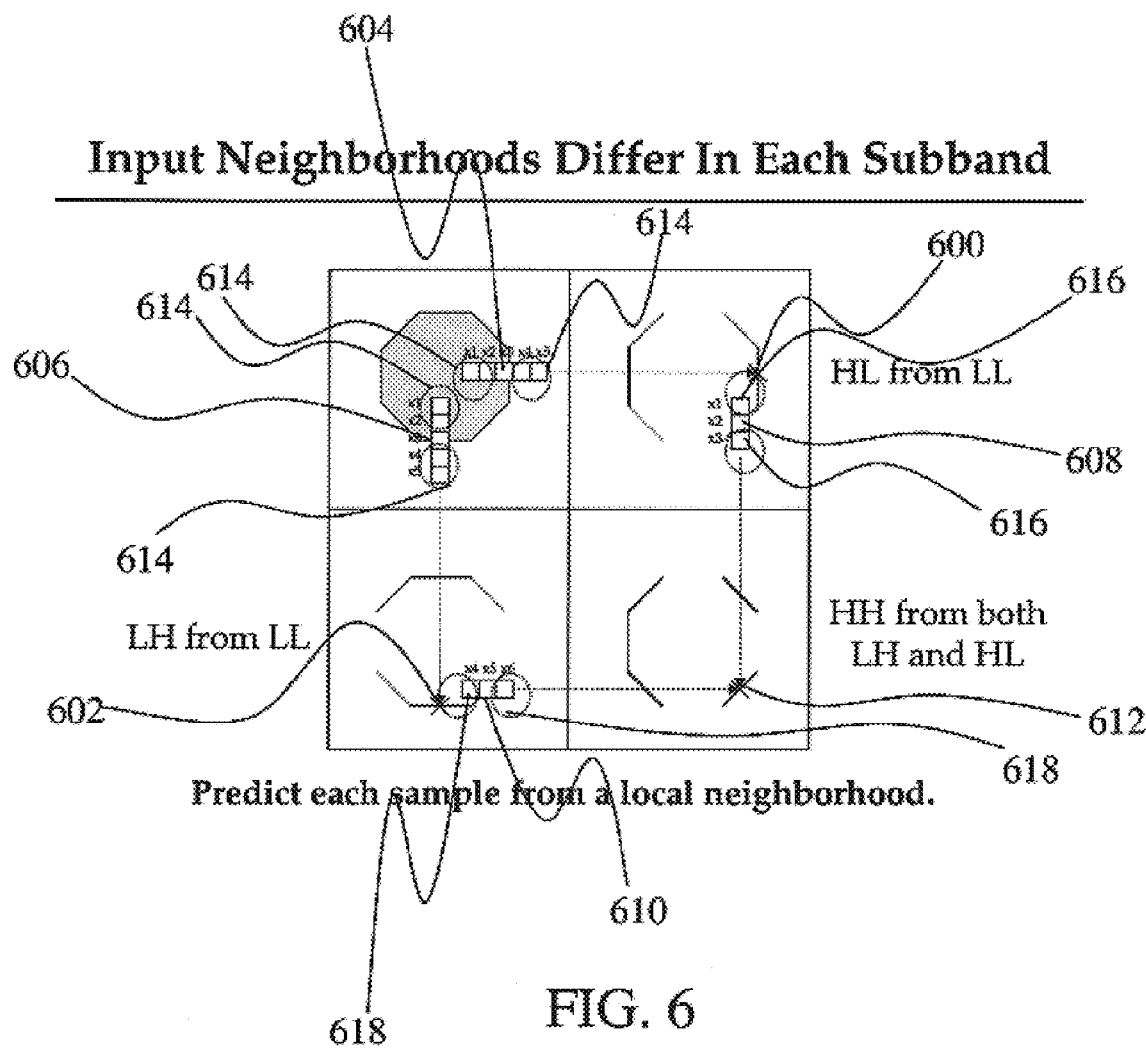
FIG. 6 depicts the coefficient prediction protocol for the coefficients of one level within a multiresolution decomposition.

The details of the coefficient prediction scheme are similar for all three upper frequency subbands, with the only difference relating to the geometry and content of the input fields. The term "input field" relates to the source of the information that is used as the basis for the prediction. A diagram illustrating these input fields is shown in FIG. 6. Each individual coefficient 600 and 602 is predicted from an input neighborhood. An input neighborhood for the HL subband is shown as a horizontal window 604. In the embodiment shown in FIG. 6, the horizontal window 604 is shown as being five pixels wide and one pixel high. As was previously stated, the LL subband is used to predict each coefficient in the HL subband. According to this embodiment a vertical window 606 five pixels high and one pixel wide is shown in FIG. 6, and is used to predict each coefficient in the LH subband. The two windows of information from the LL subband provide data to the upper frequency subbands LH and HL. After the data has been conveyed to both the LH and HL subbands, the LH subband 610 and the HL subband 608, serve as the basis for the prediction of the HH coefficients 612. In this embodiment, a horizontal window three pixels wide and one pixel high 610 in the LH subband and a vertical window currently three pixels high and one pixel wide 608 in the HL subband are concatenated and are used to predict each coefficient 612 in the HH subband. It should be noted that the coefficient being predicted corresponds physically with the center pixel of the input neighborhood.

To classify whether an upper frequency subband coefficient is significant or insignificant, it is necessary to first empirically model statistical relationships between the upper subband and its unique input field. This is done in an effort to determine the intra-band coefficient relationships characteristic of natural images in the wavelet transform domain. The model relates the change in value (local slope) across the input field of coefficients to a probability that a given upper frequency coefficient is significant or insignificant. In the case of HL and LH subband coefficient prediction, the slope of a given input field is calculated as:

$$m=\{(x1+x2)/2\}-\{(x4+x5)/2\}$$

where x1, x2, x4, and x5 614 represent samples in the neighborhood of LL coefficients. In the case of HH subband prediction, the slope of a given input field is calculated as:

$$m = \max\{(x1-x3), (x4-x6)\}$$

where x1, x3 616, and x4, x6 618 represent samples in the HL and LH neighborhoods respectively. Using the preceding definitions of slope, it is possible to estimate the following probabilities for the three high-frequency subbands, specifically HL, LH, and HH. In each individual image:

p(nz)—the probability that a coefficient is significant,

P(z)—the probability that a coefficient is insignificant, p(m|nz)—the conditional probability of an input slope value given that the coefficient is significant, and p(m|z)—the conditional probability of an input slope value given that the coefficient is insignificant.

Next, using the following equations from Bayes Rule, $$p(m, z) = p(m|z)P(z) \text{ and } p(m, nz) = p(m|nz)P(nz),$$

where p(m, z) is the joint probability of a particular slope value generating an insignificant coefficient, and p(m, nz) is the joint probability of a particular slope value generating a significant coefficient.

In addition to the probabilities described above, the cost of misclassification is calculated. The cost of misclassification is defined as the number of bits necessary for transmitting corrections when the significance classification process is not correct. Define $\lambda(z|nz)$ as the cost of classifying a coefficient as insignificant when the true state is significant, and define $\lambda(nz|z)$ as the cost of classifying a coefficient as significant when the true state is insignificant. Using these definitions, the minimum number of transmission bits for corrections is defined as:

$$\lambda_{min} = \lambda(z|nz) + \lambda(nz|z).$$

The value $\lambda_{min}$ is determined experimentally for each image using a variety of common coding techniques such as a bit string code or a run length code. The components of $\lambda_{min}$ then define the ratio, $$\tau = \frac{\lambda(z|nz)}{\lambda(nz|z)}.$$

Now according to Bayes Decision Theory, class 'z' is selected (the coefficient is insignificant) if, $$\frac{p(m, z)}{p(m, nz)} > \tau.$$

Figure 7:
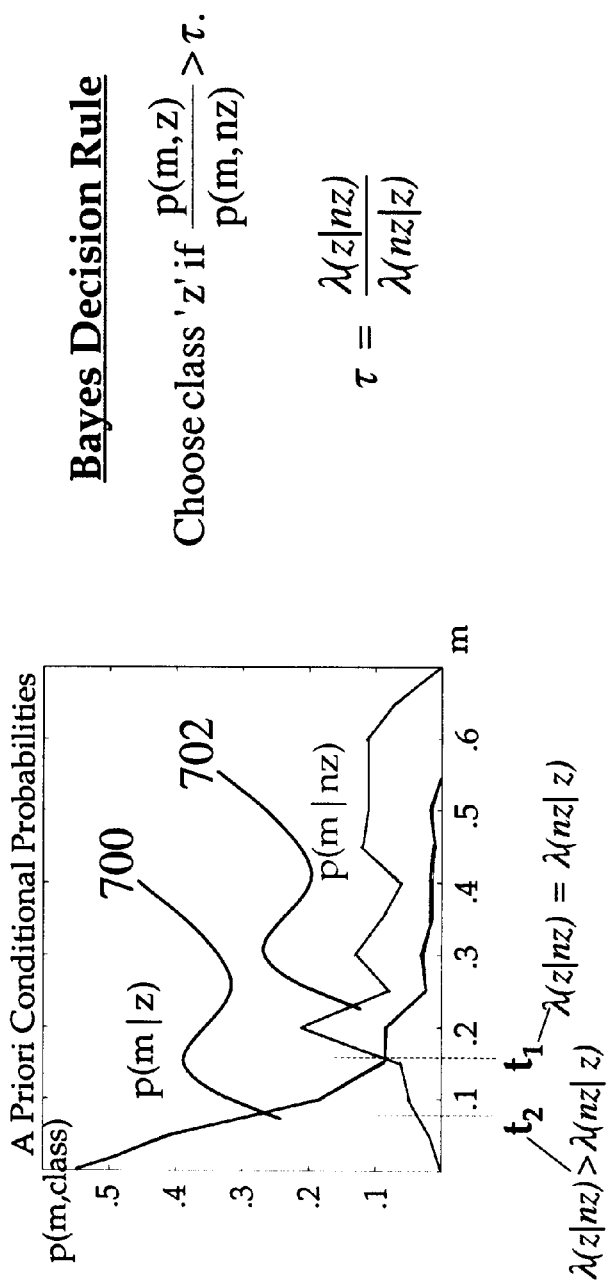
FIG. 7 is a plot showing both the probability that a coefficient is significant and the probability that it is not significant; this plot is used in conjunction with Bayes decision rule to identify significant and insignificant subband coefficients.

Otherwise, class 'nz' is selected (the coefficient is significant). The ratio in the above equation is known as the likelihood ratio, and the two joint probabilities in the above equation are shown in the graph of FIG. 7. From the graph of FIG. 7, it is possible to determine the slope M, where the likelihood ratio equals the value $\tau$, and select this slope M, as the threshold for classification. Classification is based on the slope calculated from the input field to the Bayes Classifier. The above classification scheme is outlined in FIG. 7. In essence, FIG. 7 depicts two curves. The first curve p(m|z) 700 represents the conditional probability of an input slope value given that the coefficient is insignificant. The second curve p(m|nz) 702 represents the conditional probability of an input slope value given that the coefficient is significant. $t_1$ represents the point where the cost of classifying a coefficient as insignificant when the true state is significant is equal to the cost of classifying a coefficient as significant when the true state is insignificant. $t_2$ represents the region where the coefficient is deemed significant. The necessary probabilities have to be estimated for each subband individually, and thus, a different threshold value is used for each subband. Additionally, unique threshold values are currently determined for each image. However, a series of training images could be used to generate a global threshold for each subband.

Figure 8:
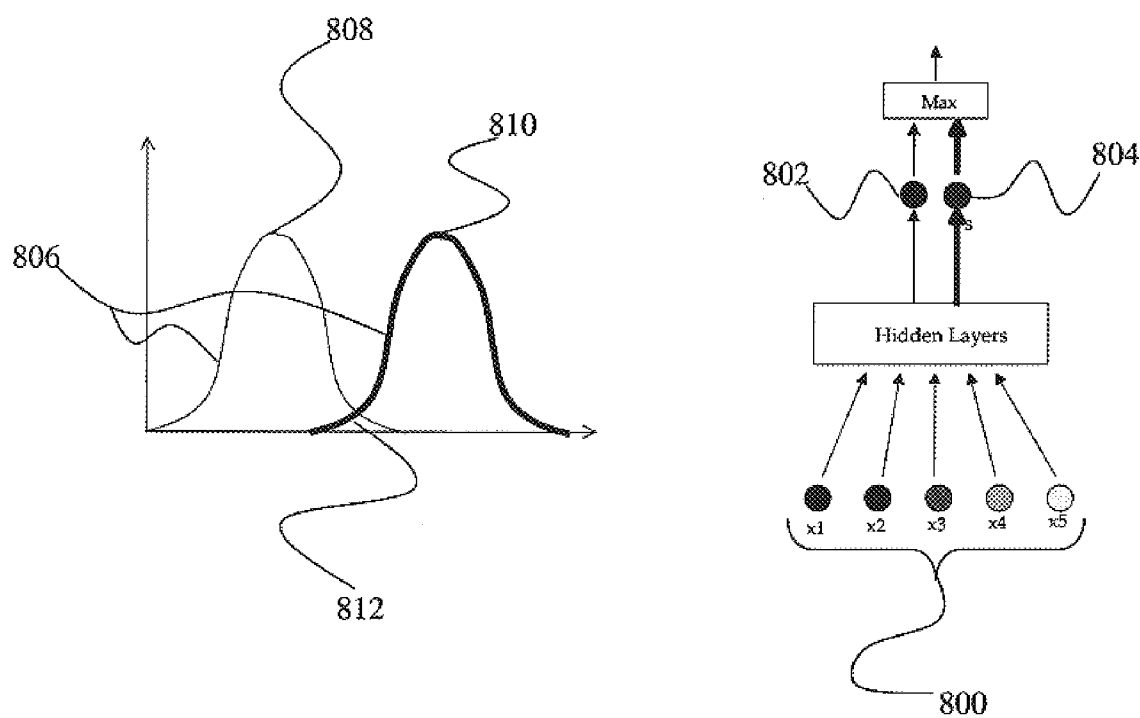
FIG. 8a is a graph of the response curves for negative and positive outputs from the neural network.
FIG. 8b, is a schematic showing the inputs used when predicting the vertical and horizontal subbands.

Once a coefficient has been classified as significant or insignificant, the values of the significant coefficients are estimated with a three layer, feedforward neural network, which is illustrated in FIG. 8. For each subband, the same input field used with the Bayesian classifier is also used with the neural network. Thus, the neural network takes a plurality of inputs 800, in this case five, from 604 and 606, when predicting either the HL or LH coefficients. Similarly, input is taken from the LH and HL subband coefficients when predicting the HH subband coefficients. Each coefficient in a subband is denoted c0, c1, c2, or c3, and is known as one of a group of four. This is explained later in conjunction with FIG. 9. Four subband coefficients on pyramid decomposition level n emanate from one coefficient on level n−1. For historical reasons, the current implementation employs a different neural network for each of the four types of subband coefficients (c0, c1, c2, and c3) in a subband. The number of nodes in the hidden layer for each of the currently used networks is given in Table 1 below.

TABLE 1

| | HL subband | | LH subband | | HH subband | |
|---|---|---|---|---|---|---|
| | Level 1 | Level 2 | Level 1 | Level 2 | Level 1 | Level 2 |
| c0 | 7 | 6 | 11 | 14 | 9 | 6 |
| c1 | 13 | 7 | 13 | 7 | 11 | 8 |
| c2 | 11 | 13 | 8 | 9 | 7 | 9 |
| c3 | 8 | 9 | 10 | 9 | 9 | 7 |

Each neural network has two output neurons, one trained to predict the positive coefficient values 802 and one trained to predict the negative coefficient values 804. The maximum value of the two output nodes determines the sign, and the absolute value of the maximum determines the magnitude of the predicted coefficient. The two tuning curves 806 for the output graphically depict the response for the positive output 808 and the negative output 810. The nexus area 812, where baseline resolution is lacking, indicates the area where output response errors may occur.

Figure 9:
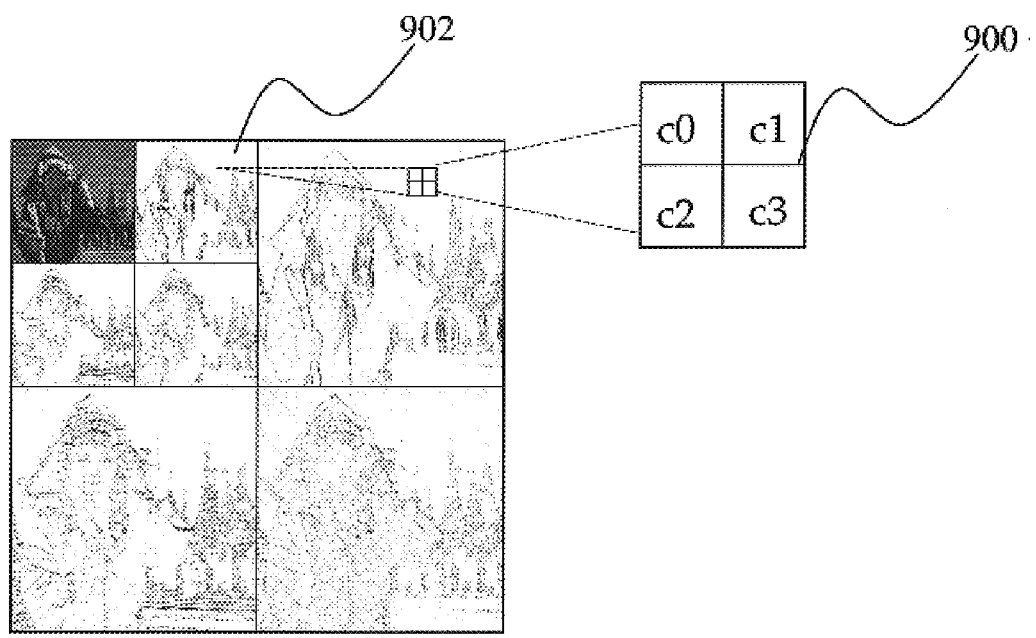
FIG. 9 depicts the one to four upsampling between levels, in this case this is a two level pyramid.

As previously stated, each coefficient in a subband is denoted as either c0, c1, c2, or c3, and known as one of a group of four. Four coefficients on pyramid decomposition level n emanate from one coefficient on level n−1. These are shown in FIG. 9. The four coefficients 900 in decomposition level n have their genesis in a single coefficient 902 in the n−1 decomposition level. In the current implementation, a different neural network is used for each of the four coefficients of each subband on each level. The number of neural networks can be reduced by using the same network for all four types (c0, c1, c2, and c3) of coefficients in the same subband. The data input to the neural network is the same as the data input to the Bayesian Classifier in every case, and may vary between values of −1.0 to 1.0. The number of neurons in the middle layer 812 varies for each subband and level, and is selected experimentally. The exact number of nodes used in the current implementation is given in the discussion of Table 1 and FIG. 8, while their values are allowed to vary between −1.0 and 1.0.

The neural network architecture contains two output neurons. The first is for positive coefficient values, and is termed node a, the negative output node is held to zero during this part of the training. The second output neuron is for negative coefficient values, termed node b, during this part of the training the positive output node is held to zero. These output nodes are only allowed to vary between 0.0 and 0.9. Thus, during operation, the maximum of the two output nodes is accepted as the valid estimation of magnitude of the predicted coefficient. Thus, predicted coefficient magnitude=max($y_a$, $y_b$), where $y_a$ is the output of node a; and $y_b$ is the output of node b.

The larger of the two output nodes also denotes the sign of the predicted coefficient. Thus, predicted coefficient sign=+1, if $y_a > y_b$ or =−1, if $y_b > y_a$.

Each neural network is trained over the same set of several images using a standard back-propagation training algorithm. Once training is complete, the weight values are stored, and operation of the algorithm remains fixed over any test image.

In operation, the procedure for predicting the coefficients in one level of a subband decomposition, as described above, can be applied recursively to predict the upper frequency coefficients at multiple pyramid decomposition levels. For a multilevel subband decomposition, the procedure is performed as follows:

1. Define n as the number of levels in the given subband decomposition;
2. Estimate the coefficients of the three upper subbands of level n;
3. Reconstruct the low frequency subband of level n−1 with the synthesis filters designed in the subband analysis; and
4. Replace n with n−1 and begin again with step 1

This sequence is performed recursively until n equals 0. When n=0 the original image size has been reconstructed. Also note that step two is performed using the prediction process described above in conjunction with FIG. 5.

The subband coefficient prediction scheme of the present invention can be employed as an effective tool for image compression. Further, the methods according to the present invention have application in the area of image enhancement and reconstruction. Both applications require only minimal adaptation of the present invention. For example, different thresholds might be selected for the Bayesian Classifier in the two applications noted above. In the image compression application, the threshold would be selected to minimize transmission costs, whereas in the image enhancement application Bayesian Classifier would be chosen to minimize actual errors. Furthermore, image enhancement applications may call for training over a particular class of images to facilitate accuracy. This is because error terms typically cannot be generated in the case of image enhancement because there is usually no 'true' data available.

Figure 10:
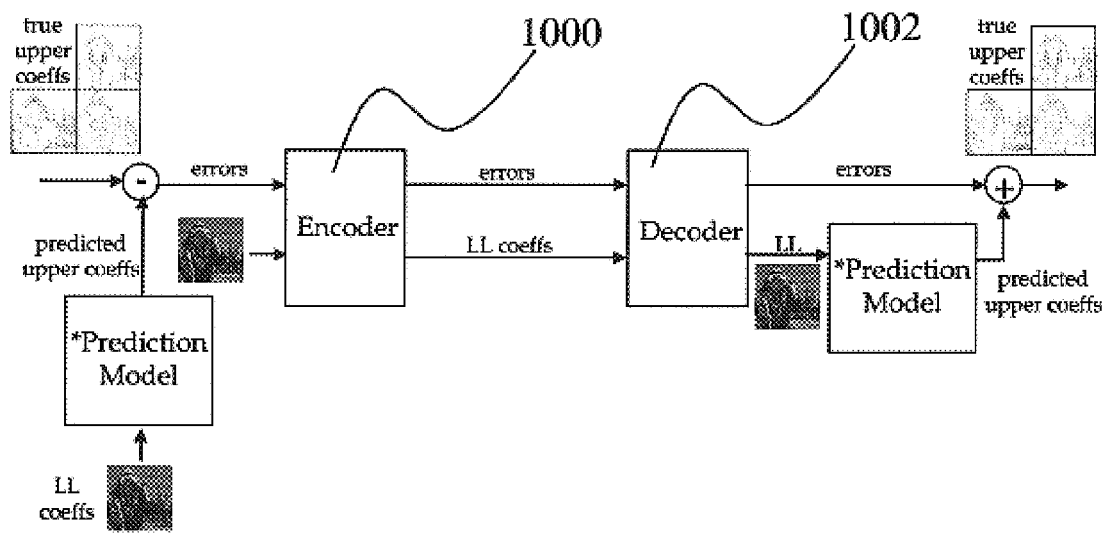
FIG. 10 is a block diagram of the data coder.

The block diagram of the image coder model illustrated in FIG. 10 shows the present invention functioning as a data compression system. Both the encoder 1000 and decoder 1002 are augmented by replicate learning models, which are used to predict the upper subband coefficient data within a wavelet decomposition. Only the LL subband coefficients of the smallest level within the wavelet decomposition must be transmitted verbatim. All of the remaining upper subbands are predicted by the recursive coefficient prediction procedure described above. For the upper frequency subbands, the errors, which are defined by the learning model at the encoder, may be transmitted for use at the decoder. All of the errors must be transmitted for lossless compression, while only some of the errors must be transmitted for lossy compression.

The data rate reduction is based on the variance and shape of the error distribution. The savings can be generalized to approximate $$H_e = H_o - \log(\alpha),$$

where, for the general case, $\alpha$ is defined as $$\alpha = \frac{\sigma_o}{\sigma_e},$$

where $H_e$ is the entropy of the error distribution; and $H_o$ is the entropy of the original distribution. The value $\sigma_e$ is the standard deviation of the error distribution; and $\sigma_o$ is standard deviation of the original distributions.

In the compression application, the prediction module consists of the two learning models discussed above, namely a Bayesian classifier and a neural network, as shown in FIG. 5. Because the neural network undergoes off-line training on a set of sample images, the resulting weights are stored prior to operation at both the encoder and decoder. The Bayesian Classifier can use a series of training images to generate a global threshold for each subband. In this configuration, all the prediction parameters are stored in advance at both the encoder and decoder, thus facilitating more secure data encryption. The encryption properties are very desirable because invention only requires the transmission of the error terms, much of the structure from the subband decomposition is removed, consequently the transmission more closely resembles noise. Furthermore, the number and values of the weights for reconstruction are never transmitted and remain secure. Alternatively, the system can determine the optimal threshold for the Bayesian Classifier for each image individually.

Both the Bayesian Classifier and neural network can produce errors. The Bayesian Classifier can incorrectly classify the significance of the coefficient, the incorrect identification leads to a binary string. Errors in the sign of the predicted coefficient at the output of the neural network also may lead to a binary string. At the decoder, the sign error is defined as follows:

sign flip error=−1, if there is a sign error and

=+1, if there is no sign error

Additionally, the neural network can have errors in the predicted magnitude of the coefficient, resulting in a string of analog values.

According to the image compression configuration of the present invention, to encode an image from one level of a multiresolution decomposition, the following steps are performed at the encoder:

1. Encode the x and y dimensions of the final image.
2. Encode and transmit the LL subband with as little distortion as possible. In one embodiment an entropy coder is employed for any necessary bit rate calculations.
3. Determine the optimal threshold for the Bayesian Classifier and label all of the upper subband coefficients as significant or insignificant based on this threshold; store misclassifications, generally in the form of significance map errors.
4. Operate the neural network on the requisite input data and store the errors made in the sign of the predicted value as well as the errors made in the magnitude prediction. Both magnitude and sign errors are defined as:

error term=|true value|−predicted value|.

5. Encode and transmit the optimal threshold value for the Bayes Classifier.
6. Encode and transmit the significance map errors. These errors are binary, and may be encoded by a positional code, a bit string code, or a run length code, with the method selected experimentally for each image to provide a minimum transmission of data.
7. Encode and transmit the sign errors. These errors are also binary, and may be encoded by a positional code, a bit string code, or a run length code, with the method selected experimentally for each image to provide a minimum transmission of data.
8. Encode and transmit the magnitude errors. An entropy code may be employed to calculate any necessary data rates.
9. Transmit the coding method selected in steps 6 and 7.

To decode an image from one level of a multiresolution decomposition, according to the image compression configuration of the present invention, the following steps are performed at the decoder:

1. Decode the x and y dimensions of the final image, as well as the coding methods selected for the binary strings denoting the significance map and sign flip errors.
2. Decode the LL subband.
3. Operate the Bayesian Classifier and label all of the upper subband coefficients as significant or insignificant based on the decoded threshold value.
4. Decode the significance map errors and correct any misclassifications.
5. Operate the neural network and extract values, both sign and magnitude, for all the significant coefficients.
6. Decode the magnitude and sign flip errors. Compute the coefficient's predicted value by the following equation, reconstructed value=(|predicted value|+error term)·sign flip error·sign value 7. Employ the synthesis filter bank designed in the subband analysis and reconstruct the original image.

In operating the invention as a compression system, the system performs the above operations for HL and LH subbands first, and then for the HH subband on each side of the channel. It should be noted that for a full recursive implementation of the compression scheme, the number of pyramid decomposition levels must also be transmitted.

In addition to improved transmission efficiency, the present invention allows for progressive image transmission. To progressively improve image reconstruction at the decoder, the following transmission techniques may be utilized:

1. Transmit only the sign flip and significance map errors. This method can be used most effectively for Very Low Bit Rate applications.
2. Transmit all magnitude error terms that are greater than 10% of the true coefficient value for the significant coefficients, resulting in a lossy reconstruction of the image.
3. Transmit all remaining magnitude error terms for the significant coefficients, again resulting in a lossy reconstruction of the image.
4. Transmit all the insignificant coefficient values, resulting in a lossless reconstruction of the image.

Figure 11:
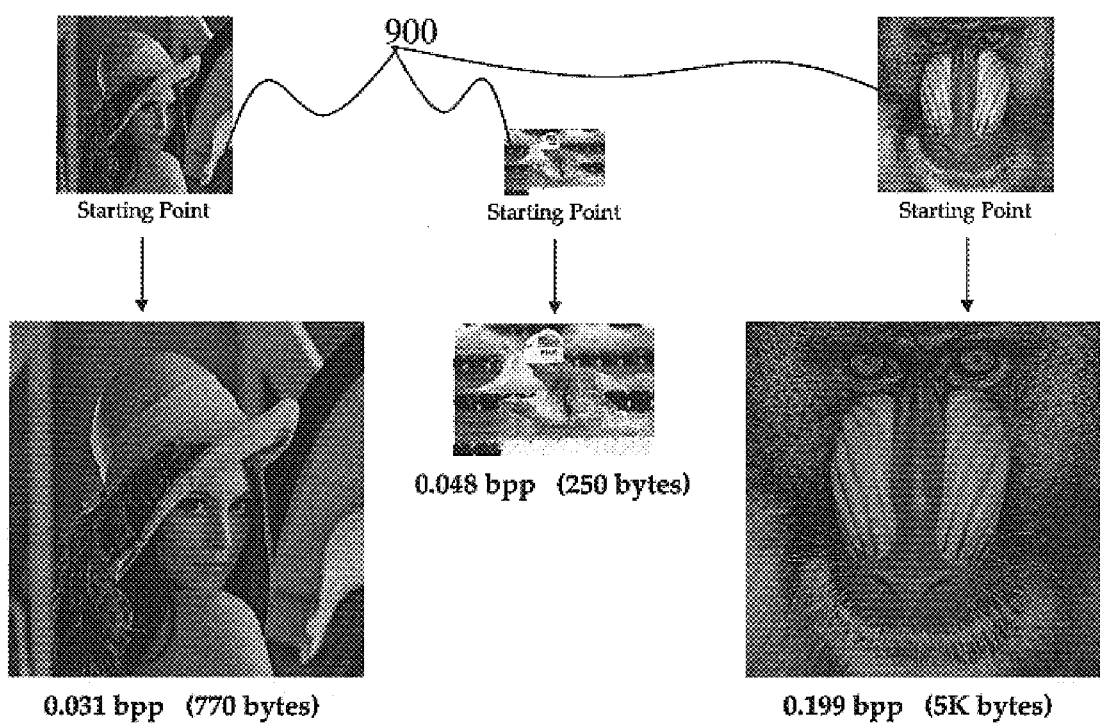
FIG. 11 is an illustration of three examples of image reconstruction for Very Low Bit Rate applications.

Three examples of image reconstruction for Very Low Bit Rate applications are shown in FIG. 11. Very Low Bit Rate means that only the significance map errors and sign flip errors were transmitted and employed at the decoder. For these three images, coefficient prediction was employed for one level of the wavelet decomposition. The starting point or LL subband of level one 1100 is shown in the top of FIG. 11. By employing the coefficient prediction algorithm it was possible to reconstruct the original size image at the rates given in FIG. 11 with the visual quality exhibited therein.

Figure 12:
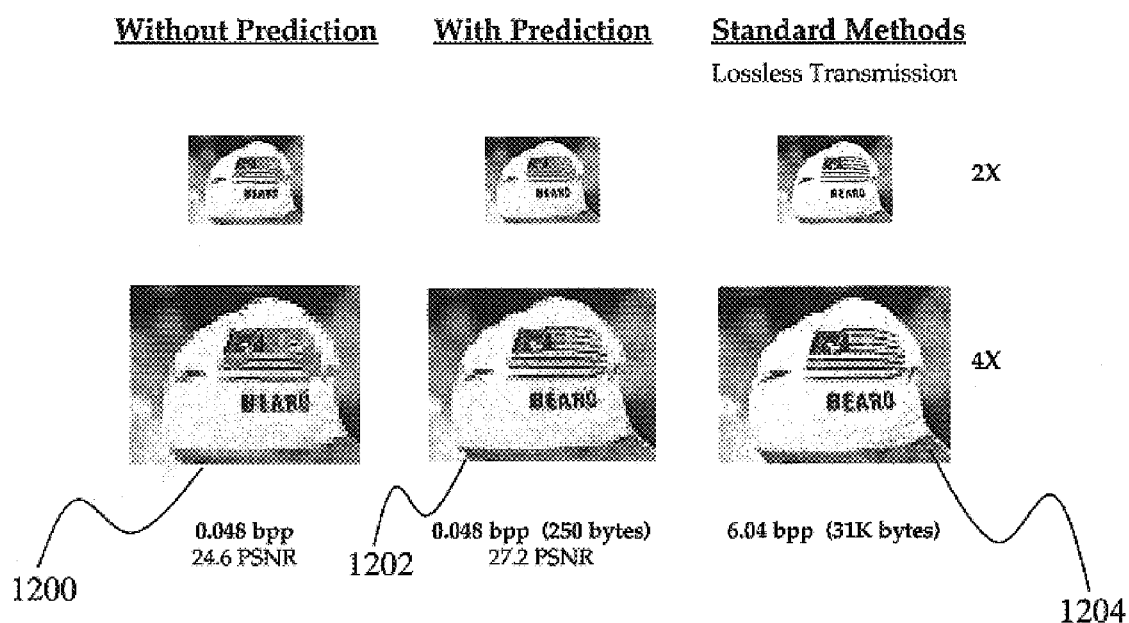
FIG. 12 is an illustration of how the coefficient prediction algorithm performs at Very Low Bit Rates, the results are comparable to standard lossless transmission methods.

Another illustration of how well the coefficient prediction algorithm performs at very low bit rates is provided in FIG. 12. The image on the far right 1200 is shown for reference and displays reconstruction after transmission of all the wavelet coefficients. In this case, the rate is computed as simply the entropy of all the coefficient data. The image in the middle 1202 of FIG. 12 exhibits reconstruction with the coefficient prediction algorithm when only sign flip errors and significance map errors have been transmitted, which results in very minimal data requirements, specifically 250 bytes. The image on the left 1204 is created using a standard transmission technique, wherein the data transfer rate is calculated by computing entropy. The significant coefficients, in descending order, along with their corresponding geographical locations (no significance map is transmitted) are transmitted until a rate equivalent to the Coefficient Prediction rate (250 bytes) is achieved. Next, image quality, measured in terms of peak signal to noise ratio (PSNR) is compared for the same bit-rate. The Coefficient Prediction technique achieves a 27.2 PSNR, a 10.5% increase over the 24.6 PSNR of the standard image coding technique. This coupled with the visual similarity of reconstructed image 1204 to the reference image 1200 noted in the flag and letters illustrate the accuracy of the prediction of the significant coefficient magnitudes.

The accuracy of the prediction system when used in an image coding application is demonstrated in FIG. 11 and FIG. 12. In both FIG. 11 and FIG. 12, the reconstructed images rely solely on the prediction precision of the neural network for the significant coefficients' magnitude values, as no magnitude error terms are transmitted. This precision is illustrated by the fidelity and visual quality of the reconstructed images in both figures. Furthermore, the low bit rates demonstrate the accuracy of the significance classification by the Bayesian Classifier and the accuracy of the sign value prediction for the significant coefficients by the neural network.

What is claimed is:

1. A means for predicting a value of upper subband frequency coefficients in a subband decomposition pyramid;

a. wherein the pyramid has n decomposition levels, where n is the highest level and each level in the subband decomposition pyramid has a plurality of subbands and each subband has a plurality of coefficients and each coefficient has a sign, magnitude and significance or an insignificance, and wherein the plurality of subbands includes:
  i. at least one vertical subband comprising a plurality of low frequency coefficients from the vertical data components within the highest level of level of said decomposition pyramid and a plurality of high frequency coefficients from the horizontal data components within the highest level of said decomposition pyramid;
  ii. at least one horizontal subband comprising a plurality of low frequency coefficients from the horizontal data components within the n level of said decomposition pyramid and a plurality of high frequency coefficients from the vertical data components within the n level of said decomposition pyramid;
  iii. at least one diagonal subband comprising a plurality of high frequency coefficients from both the vertical and horizontal data components within the n level of said decomposition pyramid; and
b. wherein the coefficients for the vertical and horizontal subbands are predicted from information contained in a low pass subband of level n; and wherein the coefficients for the diagonal subband are predicted from information in the vertical and horizontal subbands; and
wherein the prediction process is carried out recursively setting n equal to n−1 for each level of the decomposition until n equals 0 and the original image size has been reconstructed.

2. A means for predicting the value of upper subband frequency coefficients according to claim 1, wherein in step b:
  i. each coefficient in the horizontal subband is predicted from a plurality of concatenated points in a localized input neighborhood within the low pass subband, where the concatenated points ave a vertical to horizontal aspect ratio less than unity;
  ii. each coefficient in the vertical subband is predicted from a plurality of concatenated points in a localized input neighborhood within the low pass subband, where the input neighborhood has a vertical to horizontal aspect ratio more than unity; and
  each coefficient in the diagonal subband is predicted from a plurality of concatenated points in localized input neighborhoods from both the vertical and horizontal subbands, wherein;
    i. the vertical to horizontal aspect ratio from the localized input from the horizontal subband is less than unity and less than the aspect ratio from the localized input neighborhood within the low pass subband; and
    ii. the vertical to horizontal aspect ratio from the localized input from the vertical subband is greater than unity but less than the aspect ratio from the localized input neighborhood within the. low pass subband.

3. The means for predicting the value of upper subband frequency coefficients according to claim 2 wherein all of the coefficients have values and all the coefficients are deemed to be either significant or insignificant and wherein:
  i. significant coefficients are separated from insignificant coefficients;
  ii. the value of the significant coefficients are estimated;
  iii. the value of the insignificant coefficients are estimated to be zero; and
  iv. the process i–iii is performed recursively over each level of the decomposition pyramid.

4. The means for predicting the value of upper subband frequency coefficients according to claim 3 wherein:
  i. a Bayesian classifier is used distinguish between the significant coefficients and the insignificant coefficients;
  ii. coefficients that are classified as significant have their sign and magnitude determined by a neural network.

5. The means for predicting the value of upper subband frequency coefficients according to claim 1 wherein:
  i. a Bayesian classifier is used distinguish between the significant coefficients and insignificant coefficients;
  ii. the value of the insignificant coefficients are estimated to be zero;
  iii. coefficients that are classified as significant have their sign and magnitude determined by a neural network; and
  iv. the process i–iii is performed recursively over each level of the decomposition pyramid.

6. A method for predicting coefficients in the $n^{th}$ level of an n-level multiresolution decomposition pyramid, having a plurality of subbands including a low-pass subband, a vertical subband, a horizontal subband and a diagonal subband, and wherein a plurality of the subbands have higher and lower frequency coefficients, whereine predicted coefficients are used to predict upper frequency coefficients for the vertical, horizontal and diagonal subbands in the multiresolution decomposition pyramid for levels at and below n, comprising the steps of:
  i. defining n as the number of levels in the multiresolution decomposition pyramid;
  ii. estimating the coefficient properties of the vertical, horizontal and diagonal subbands;
  iii. reconstructing the low frequency subband of level n−1 with the aid of a conventional analysis/synthesis filter bank;
  iv. replace n with n−1 and repeat steps i though iv until n is equal to zero.

7. A method for improving data transmission rates comprising the steps of encoding, transmitting and decoding data;
  a. wherein the encoder performs steps comprised of:
    i. using a conventional analysis filter array decompose an image having x and y dimensions to produce a multiresolution decomposition, wherein the multiresolution decomposition comprises a low pass subband, and a plurality of upper subbands, wherein said upper subbands include a vertical subband, a horizontal subband and a diagonal subband and wherein each subband has a plurality of coefficients;
    ii. encoding the x and y dimensions for dimensions of the final image;
    iii. encoding and transmitting the low pass subband;
    iv. determining an optimal threshold for a Bayes-theory based classifier, hereinafter a Bayesian Classifier, and label all of the upper subband coefficients as significant or insignificant based on this optimal threshold;
    v. storing significance map errors or other misclassifications;
    vi. operating a neural network utilizing data from the multiresolution decomposition;
    vii. storing errors made in the sign of the predicted value as well as the errors made in predicting the magnitude, where both magnitude and sign errors are defined as:

error term=|true value|−|predicted value| viii. encoding and transmitting the optimal threshold value for the Bayesian Classifier;
ix. encoding and transmitting the significance map errors;
x. encoding and transmitting the sign errors
xi. encoding and transmitting the magnitude errors; and
xii. transmitting the coding method selected in steps ix and x; and b. wherein the decoding step for an image from one level of a multiresolution decomposition, comprises the following sub-steps:
i. decoding the x and y dimensions for the final image, as well as the coding methods selected for the binary strings denoting the significance map and sign flip errors
ii. decoding the low frequency subband;
iii. Operating the Bayesian Classifier and labeling all of the upper subband coefficients as significant or insignificant based on the decoded threshold value;
iv. decoding the significance map errors and correcting any misclassifications;
v. operating the neural network and extracting values, both sign and magnitude, for all the significant coefficients;
vi. decoding the magnitude and sign flip errors, and computing the coefficient's predicted value by the following equation, reconstructed value=(|predicted value|+error term)*sign flip error*sign value; and vii. employing conventional subband synthesis filters compatible with the subband analysis filters to reconstruct the original image.

8. A method for improved data transmission rates according to claim 7 wherein in sub-step iii of the encoding sequence, a, an entropy coder is employed for any necessary bit-rate calculations.

9. The method according to claim 7 sub-step iv of the encoding sequence, a, and sub-step iii of the decoding sequence, b, wherein the Bayesian classifier has an optimal threshold, wherein the Bayesian classifier uses a series of training images to generate a global threshold for each subband, and all the prediction parameters would be stored a priori at both a data coder and decoder.

10. The means according to claim 7 sub-step vi of the encoding sequence, a, and sub-step v of the decoding sequence, b, wherein the neural network undergoes offline training on a set of sample images, and wherein the resulting weights are stored prior to operation at both a data coder and decoder.

11. The method for improved data transmission rates of claim 7 wherein in sub-step ix of the encoding, a, the errors are binary; and may be encoded by a positional code, a bit string code, or a run length code, with the method selected experimentally for each image so as to provide a minimum transmission of data.

12. The method for improved data transmission rates of claim 7 wherein in sub-step x of the encoding and transmitting sequence, a, the errors are binary, and may be encoded by a positional code, a bit string code, or a run length code, with the method selected experimentally for each image to provide a minimum transmission of data.

13. The method for improved data transmission rates of claim 7 wherein in sub-step xi of the encoding sequence, a, an entropy code may be employed to calculate any necessary data rates.

14. The method for improved data transmission rates of claim 7 wherein in sub-step vii of the decoding sequence, b, the compression system performs said operations for the vertical and horizontal subbands first, and then performs for the diagonal subband on each side of the channel, wherein for a full recursive implementation of the compression scheme, the number of pyramid decomposition levels is also be transmitted.

15. An apparatus for estimating upper frequency band coefficients from low frequency information in a multiresolution subband decomposition having an n-level multiresolution decomposition pyramid, including a plurality of subbands including a low-pass subband, avertical subband, a horizontal subband and a diagonal subband, and wherein a plurality of the subbands have higher and lower frequency subband coefficients, wherein estimated coefficients are used to predict upper frequency coefficients for the vertical, horizontal and diagonal subbands in the multiresolution decomposition pyramid for levels at and below n wherein the apparatus comprises:
i. a Bayesian based classifier capable of predicting the significance, or insignificance of a high frequency signal; and
ii. a neural network capable of estimating the sign and magnitude of visually significant information;
wherein the apparatus for estimating is capable of estimating the upper frequencies from lower frequencies within the same level of the decomposition pyramid and subsequently is capable of performing this estimation recursively at each level of the multiresolution decomposition.

16. The apparatus according to claim 15 wherein the Bayesian classifier has an optimal threshold, wherein the Bayesian classifier uses a series of training images to generate a global threshold for each subband, and all the prediction parameters would be stored a priori at both a data coder and decoder.

17. The apparatus according to claim 15 wherein the neural network undergoes offline training on a set of sample images, and wherein the resulting weights are stored prior to operation at both a data coder and decoder.

18. An apparatus for progressively improving image reconstruction at an image decoder comprising;
an analysis filter band that converts an image to a multiresolution subband decomposition having a plurality of n levels and wherein each level includes a plurality of subbands including a low pass subband, a vertical subband, a horizontal subband and a vertical subband, wherein the vertical, horizontal, and diagonal subbands have upper subband coefficients, and wherein a Bayesian classifier sets an optimal threshold and classifies and labels the upper subband coefficients as significant or insignificant based on the optimal threshold; and wherein a neural network utilizes data from the multiresolution to generate values for introduced errors within the decomposition; wherein the apparatus:
i. transmits only sign flip and significance map errors;
ii. transmits all magnitude error terms that are greater than 10% of the true coefficient value for the significant coefficients;
iii. transmits all the remaining magnitude error terms for the significant coefficients;
iv. transmits all the insignificant coefficient values;
wherein step i is ideal for Very Low Bit Rate applications; and
wherein steps i, ii in the aggregate and steps i, ii, and iii in the aggregate result lossy image reconstruction; and
wherein steps i, ii, iii and iv in the aggregate results in a lossless reconstruction of the of the image.

19. The apparatus according to claim 18 wherein the Bayesian classifier has an optimal threshold, wherein the Bayesian classifier uses a series of training images to generate a global threshold for each subband, and all the prediction parameters would be stored a priori at both a data coder and decoder.

20. The apparatus according to claim 18 wherein the neural network undergoes offline training on a set of sample images, and wherein the resulting weights are stored prior to operation at both a data coder and decoder.

21. A method for data encryption comprising the steps of encoding, transmitting and decoding data;
   a. wherein the encoder performs steps comprised of:
      i. using a conventional analysis filter array decompose an image having x and y dimensions to produce a multiresolution decomposition, wherein the multi-resolution decomposition comprises a low pass subband, and a plurality of upper subbands, wherein said upper subbands include a vertical subband, a horizontal subband and a diagonal subband and wherein each subband has a plurality of coefficients;
      ii. encoding the x and y dimensions for dimensions of the final image;
      iii. encoding and transmitting the low pass subband;
      iv. determining an optimal threshold for a Bayes-theory based classifier, hereinafter a Bayesian Classifier, and label all of the upper subband coefficients as significant or insignificant based on this optimal threshold;
      v. storing significance map errors or other misclassifications;
      vi. operating a neural network utilizing data from the multiresolution decomposition;
      vii. storing errors made in the sign of the predicted value as well as the errors made in predicting the magnitude, where both magnitude and sign errors are defined as:

error term=|true value|−|predicted value|;

viii. encoding and transmitting the optimal threshold value for the Bayesian Classifier;
      ix. encoding and transmitting the significance map errors;
      x. encoding and transmitting the sign errors;
      xi. encoding and transmitting the magnitude errors;
      xii. transmitting the coding method selected in steps ix and x; and
   b. wherein the decoding step for an image from one level of a multiresolution decomposition, comprises the following sub-steps:
      i. decoding the x and y dimensions for the final image, as well as the coding methods selected for the binary strings denoting the significance map and sign flip errors;
      ii. decoding the low frequency subband;
      iii. operating the Bayesian Classifier and labeling all of the upper subband coefficients as significant or insignificant based on the decoded threshold value;
      iv. decoding the significance map errors and correcting any misclassifications;
      v. operating the neural network and extracting values, both sign and magnitude, for all the significant coefficients;
      vi. decoding the magnitude and sign flip errors, and computing the coefficient's predicted value by the following equation, reconstructed value=(|predicted value|+error term)*sign flip error*sign value; and vii. employing conventional subband synthesis filters compatible with the subband analysis filters to reconstruct the original image.

22. An apparatus for data encryption comprising a means for encoding, transmitting and decoding data;
   a. wherein the encoder performs steps comprised of:
      i. using a conventional analysis filter array decompose an image having x and y dimensions to produce a multiresolution decomposition, wherein the multi-resolution decomposition comprises a low pass subband, and a plurality of upper subbands, wherein said upper subbands include a vertical subband, a horizontal subband and a diagonal subband and wherein each subband has a plurality of coefficients;
      ii. encoding the x and y dimensions for dimensions of the final image;
      iii. encoding and transmitting the low pass subband;
      iv. determining an optimal threshold for a Bayes-theory based classifier, hereinafter a Bayesian Classifier, and label all of the upper subband coefficients as significant or insignificant based on this optimal threshold;
      v. storing significance map errors or other misclassifications;
      vi. operating a neural network utilizing data from the multiresolution decomposition;
      vii. storing errors made in the sign of the predicted value as well as the errors made in predicting the magnitude, where both magnitude and sign errors are defined as:

error term=|true value|−|predicted value|;

viii. encoding and transmitting the optimal threshold value for the Bayesian Classifier;
      ix. encoding and transmitting the significance map errors;
      x. encoding and transmitting the sign errors;
      xi. encoding and transmitting the magnitude errors;
      xii. transmitting the coding method selected in steps ix and x; and
   b. wherein the decoding step for an image from one level of a multiresolution decomposition, comprises the following sub-steps:
      i. decoding the x and y dimensions for the final image, as well as the coding methods selected for the binary strings denoting the significance map and sign flip errors;
      ii. decoding the low frequency subband;
      iii. operating the Bayesian Classifier and labeling all of the upper subband coefficients as significant or insignificant based on the decoded threshold value;
      iv. decoding the significance map errors and correcting any misclassifications;
      v. operating the neural network and extracting values, both sign and magnitude, for all the significant coefficients;
      vi. decoding the magnitude and sign flip errors, and computing the coefficient's predicted value by the following equation, reconstructed value=(|predicted value|+error term)*sign flip error*sign value; and vii. employing conventional subband synthesis filters compatible with the subband analysis filters to reconstruct the original image.

23. A means for data compression and decompression comprised of predicting a value of upper subband frequency coefficients in a subband decomposition pyramid;

a. wherein the pyramid has n decomposition levels, where n is the highest level and each level in the decomposition pyramid has a plurality of subbands and each subband has a plurality of coefficients and each coefficient has a sign, magnitude and significance or an insignificance, and wherein the plurality of subbands includes:
   i. at least one vertical subband comprising a plurality of low frequency coefficients from the vertical data components within the highest level of level of said decomposition pyramid and a plurality of high frequency coefficients from the horizontal data components within the highest level of said decomposition pyramid;
   ii. at least one horizontal subband comprising a plurality of low frequency coefficients from the horizontal data components within the n level of said decomposition pyramid and a plurality of high frequency coefficients from the vertical data components within the n level of said decomposition pyramid;
   iii. at least one diagonal subband comprising a plurality of high frequency coefficients from both the vertical and horizontal data components within the n level of said decomposition pyramid; and
b. wherein the coefficients for the vertical and horizontal subbands are predicted from information contained in a low pass subband of level n; and wherein the coefficients for the diagonal subband are predicted from information in the vertical and horizontal subbands; and wherein the prediction process is carried out recursively setting n equal to n−1 for each level of the decomposition until n equals 0 and the original image size has been reconstructed.

* * * * *